(12) United States Patent
Kornfeld et al.

(10) Patent No.: US 11,994,834 B2
(45) Date of Patent: May 28, 2024

(54) SYSTEM AND METHOD FOR SHARED CONTROL OF DISTRIBUTED ENERGY RESOURCES

(71) Applicant: Kitu Systems, Inc., San Diego, CA (US)

(72) Inventors: Richard Keith Kornfeld, San Diego, CA (US); Christine Canamo Leclercq, San Diego, CA (US)

(73) Assignee: Kitu Systems, Inc., San Diego, CA (US)

( * ) Notice: Subject to any disclaimer, the term of this patent is extended or adjusted under 35 U.S.C. 154(b) by 136 days.

(21) Appl. No.: 17/572,322

(22) Filed: Jan. 10, 2022

(65) Prior Publication Data

US 2022/0221831 A1  Jul. 14, 2022

Related U.S. Application Data

(60) Provisional application No. 63/135,096, filed on Jan. 8, 2021.

(51) Int. Cl.
*G05B 19/042* (2006.01)
*H02J 3/38* (2006.01)
*H02J 13/00* (2006.01)

(52) U.S. Cl.
CPC ............ *G05B 19/042* (2013.01); *H02J 3/381* (2013.01); *H02J 13/00032* (2020.01); *G05B 2219/2639* (2013.01); *H02J 2203/10* (2020.01)

(58) Field of Classification Search
CPC ........... G05B 19/042; G05B 2219/2639; H02J 3/00032; H02J 3/381; H02J 2203/10
See application file for complete search history.

(56) References Cited

U.S. PATENT DOCUMENTS

2017/0083989 A1\* 3/2017 Brockman ............. G06Q 50/06

\* cited by examiner

*Primary Examiner* — Carlos Amaya
(74) *Attorney, Agent, or Firm* — Wang Hardoon, P.C.

(57) ABSTRACT

A method of facilitating control of a distributed energy resource which includes establishing, at a platform in communication over a network with the distributed energy resource, a first control access bundle of a first rank. The first control access bundle defines a first container including a first plurality of control events for controlling a distributed energy resource. A second control access bundle of a different, second rank is also established at the platform. The second control access bundle defines a second container including a second plurality of control events for controlling the distributed energy resource. Consolidated control events are generated from the first plurality of control events and the second plurality of control events, which may be of different priority. Events corresponding to the consolidated control events are sent to the distributed energy resource, the events controlling one or more parameters of the distributed energy resource.

18 Claims, 15 Drawing Sheets

SYSTEM AND METHOD FOR SHARED CONTROL OF DISTRIBUTED ENERGY RESOURCES

CROSS-REFERENCE TO RELATED APPLICATIONS

This application claims the benefit of priority under 35 U.S.C. § 119(e) of U.S. Provisional Patent Application No. 63/135,096, entitled SYSTEM AND METHOD FOR SHARED CONTROL OF DISTRIBUTED ENERGY RESOURCES, filed Jan. 8, 2021, the content of which is incorporated herein by reference in its entirety for all purposes.

FIELD

This disclosure relates generally to distributed energy resources on an electrical power grid and, more particularly, to control of such resources.

BACKGROUND

The growing adoption of renewable energy sources such as photovoltaic solar panels, stationary energy storage or electric vehicles present a challenge to the electrical grid, which was not designed to support bi-directional power flows. Further penetration by renewable energy resources may endanger the stability of the entire grid, causing voltage or frequency issues, outages or even equipment damage.

Among the strategies designed to mitigate those risks is the ability for utilities to control distributed energy resources located behind-the-meter and coordinate their actions to provide grid-support services when needed. Example of grid-support services include voltage support, frequency regulation or reactive power injection or absorption. This approach also offers additional benefits, such as deferring or eliminating distribution upgrades or other utility-scale investments (large storage or solar power plants).

At the same time distributed energy resources have brought about a new industry, rich in jobs, innovative business models, value to end users and societal benefits such as greenhouse gas reduction. It is therefore in the interest of many stakeholders, not just end-users and grid operators to enable continued safe deployment and operation of DERs on the grid.

A key enabler of this coordination at scale is the communication infrastructure, and the capability of user devices and utility or third-party systems to reliably and securely exchange information in both directions: the grid operator needs to collect the metrology data to better assess the status of the network on a local basis and the device needs to receive instructions to adjust its behavior based on grid conditions.

Utilities and industry stakeholders worked together to design and improve the IEEE 2030.5 communication protocol which introduces the concept of curve-based controls and the capability of programming autonomous behaviors into DERs. This enables DERs to more rapidly respond to energy parameters and may facilitate some forms of remote control.

However, the access to DERs afforded by protocols such as, for example, the IEEE 2030.5 communication protocol, can lead to complications in view of the varied and possibly competing interests in DERs. For example, a DER in the form of a rooftop solar system could be owned either by a homeowner or by a third-party which sells their electricity to either the homeowner or to a utility serving the homeowner. In this case the homeowner and/or such a third-party will generally have an interest in having the solar system generate as much energy as possible, while a utility will be interested in maximizing its own returns and ensuring grid stability.

SUMMARY

The disclosure relates to a method of facilitating control of a distributed energy resource. The method includes establishing, at a platform in communication over a network with the distributed energy resource, a first control access bundle of a first rank. The first control access bundle defines a first container including a first plurality of control events for controlling a distributed energy resource. A second control access bundle of a second rank different from the first rank is also established at the platform. The second control access bundle defines a second container including a second plurality of control events for controlling the distributed energy resource. Consolidated control events are generated from the first plurality of control events and the second plurality of control events where ones of the first plurality of control events are accorded a higher priority than ones of the second plurality of control events during the generating of the consolidated control events. The method further includes sending events corresponding to the consolidated control events over the network to the distributed energy resource, the events controlling one or more parameters of the distributed energy resource.

In some variants, the higher priority results in the distributed energy resource being controlled by a one of the consolidated control events corresponding to a one of the first plurality of control events when the one of the first plurality of control events and a one of the second plurality of control events are simultaneously in an active state.

In some variants, the first control access bundle is associated with a first entity and the second control access bundle is associated with a second entity different from the first entity. In such implementations, the first control access bundle may include first access information defining access to the distributed energy resource by the first entity and the second control access bundle may include second access information defining access to the distributed energy resource by the second entity.

The method may further include establishing, at the platform, a third control access bundle of a third rank different from the first rank and the second rank. The third control access bundle may be associated with the first entity and define a third container including a third plurality of control events for controlling the distributed energy resource. In this case generating the consolidated control events is done by according higher priorities to the first plurality of control events and the second plurality of control events relative to the third plurality of control events.

In some variants, generating consolidated control events includes creating a set of simplified events using the first plurality of control events and the second plurality of control events. In such implementations, the simplified events may be executed by the distributed energy resource in compliance with a standard. In such implementations, event processing rules may be applied to the first plurality of control events and the second plurality of control events. In one such variant, the distributed energy resource is an inverter, and a virtual inverter configured to model the inverter is established at the platform.

The method may further include establishing, at the platform, a third control access bundle of a third rank different from the first rank and the second rank. The third control access bundle may be associated with the second entity and define a third container including a third plurality of control events for controlling the distributed energy resource. In this case ones of the first plurality of control events and the second plurality of control events are accorded higher priorities than the third plurality of control events during generation of the consolidated control events.

In another aspect the disclosure relates to a method of shared control of a distributed energy resource. The method includes receiving a first control access bundle of a first rank, the first control access bundle being associated with a first entity and defining a first container including a first plurality of control events for controlling a distributed energy resource. The method further includes receiving a second control access bundle of a second rank different from the first rank, the second control access bundle being associated with a second entity and defining a second container including a second plurality of control events for controlling the distributed energy resource. The first control access bundle and the second control access bundle are stored at a platform in communication with the distributed energy resource over a network. The method also includes receiving first and second instructions for controlling the distributed energy resource, the first and second instructions being respectively associated with the first entity and the second entity. The method includes generating, in response to the first instructions and the second instructions, consolidated control events from ones of the first plurality of control events and ones of the second plurality of control events where ones of the first plurality of control events are accorded a higher priority than ones of the second plurality of control events during the generating of the consolidated control events. Events corresponding to the consolidated control events are sent over the network to the distributed energy resource, the events controlling one or more parameters of the distributed energy resource.

In some variants, the higher priority results in the distributed energy resource being controlled by a one of the consolidated control events corresponding to a one of the first plurality of control events when the one of the first plurality of control events and a one of the second plurality of control events are simultaneously in an active state.

In some variants, the first control access bundle includes first access information that defines access to the distributed energy resource by the first entity and the second control access bundle includes second access information that defines access to the distributed energy resource by the second entity.

In some variants, the method may additionally establish, at the platform, a third control access bundle of a third rank different from the first rank and the second rank, the third control access bundle being associated with the first entity and defining a third container including a third plurality of control events for controlling the distributed energy resource. In such variants, generating consolidated control events may include using ones of the third plurality of control events. In such variants, higher priorities may be accorded to the ones of the first plurality of control events and the ones of the second plurality of control events relative to ones of the third plurality of control events.

In some variants, the method may additionally establish, at the platform, a third control access bundle of a third rank different from the first rank and the second rank, the third control access bundle being associated with the second entity and defining a third container including a third plurality of control events for controlling the distributed energy resource. In such variants, the consolidated control events are generated by using ones of the third plurality of control events, the ones of the first plurality of control events and the ones of the second plurality of control events being accorded higher priorities than the third plurality of control events during the generating of the consolidated control events.

In some variants, generating consolidated control events includes creating a set of simplified events using the first plurality of control events and the second plurality of control events wherein the simplified events are configured to be executed by the distributed energy resource in compliance with a standard, the creating including applying event processing rules to the first plurality of control events and the second plurality of control events. In some such variants, the distributed energy resource is an inverter, and the creating includes establishing a virtual inverter at the platform wherein the virtual inverter is configured to model the inverter.

In some variants, a plurality of distributed energy resources are connected to the platform and wherein the first control access bundle includes first access information permitting the first entity to direct ones of the first plurality of control events to each of the plurality of distributed energy resources and wherein the second control access bundle includes second access information permitting the second entity to direct ones of the first plurality of control events to only a subset of the plurality of distributed energy resources.

In some variants, the events include a stream of simplified, non-overlapping events, and the method includes simplifying the consolidated control events to create the stream of simplified, non-overlapping events.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For a better understanding of the nature and objects of various embodiments of the invention, reference should be made to the following detailed description taken in conjunction with the accompanying drawings, wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The disclosure pertains to a system and method for facilitating shared control of a distributed energy resource device among multiple interested parties. These parties may include, for example, an owner of the distributed energy resource (e.g., a homeowner), a utility, a third-party energy services provider, and others. The system may be implemented using "cloud" computing capabilities and may be integrated within a DER service platform. Alternatively, embodiments of the disclosed system may be implemented using dedicated server infrastructure.

System Overview

Figure 1:
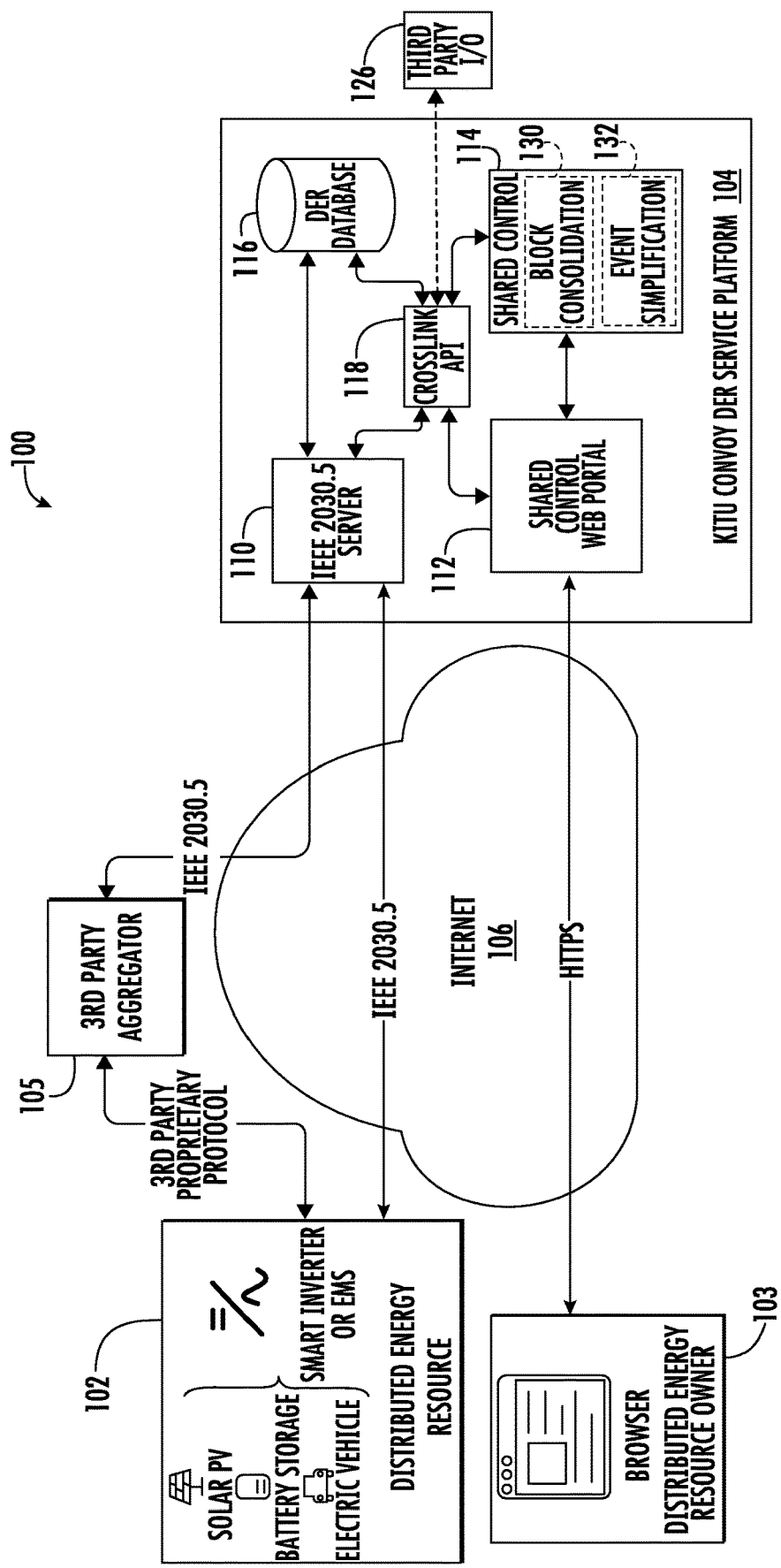
FIG. 1 illustrates a system 100 in which is implemented a system for shared control of a distributed energy resource (DER) device in accordance with an embodiment.

FIG. 1 illustrates a system 100 in which is implemented a system for shared control of a distributed energy resource device in accordance with an embodiment. The system 100 includes at least one distributed energy resource (DER) device 102, a client device 103 of an owner of the DER device 102, a DER service platform 104 configured to facilitate shared control of the DER device 102, and a 3$^{rd}$ party aggregator server 105. The elements of the system 100 may be connected via a network 106, which may be any wired or wireless network and will generally include the Internet. As shown, the DER service platform 104 includes an IEEE 2030.5 server 110, a shared control Web portal 112, a shared control module 114 and a DER database 116. The platform 104 includes a Crosslink™ API 118, which is a family of application programming interfaces enabling communication between internal services provided by the platform 104 and other applications. In one embodiment the Crosslink API 118 is a Web service RESTful API and uses the JSON data format. Either the API 118 or a standards-based interface such as IEEE 2030.5 (not shown) supports communication 126 between the platform 104 and utilities and other third-party service providers (not shown) of the platform 104 having an interest in controlling the DER device 102. The platform 104 may also be referred to herein and within the drawings as "Convoy™", the "Convoy DER Service Platform", or the like.

Figure 2:
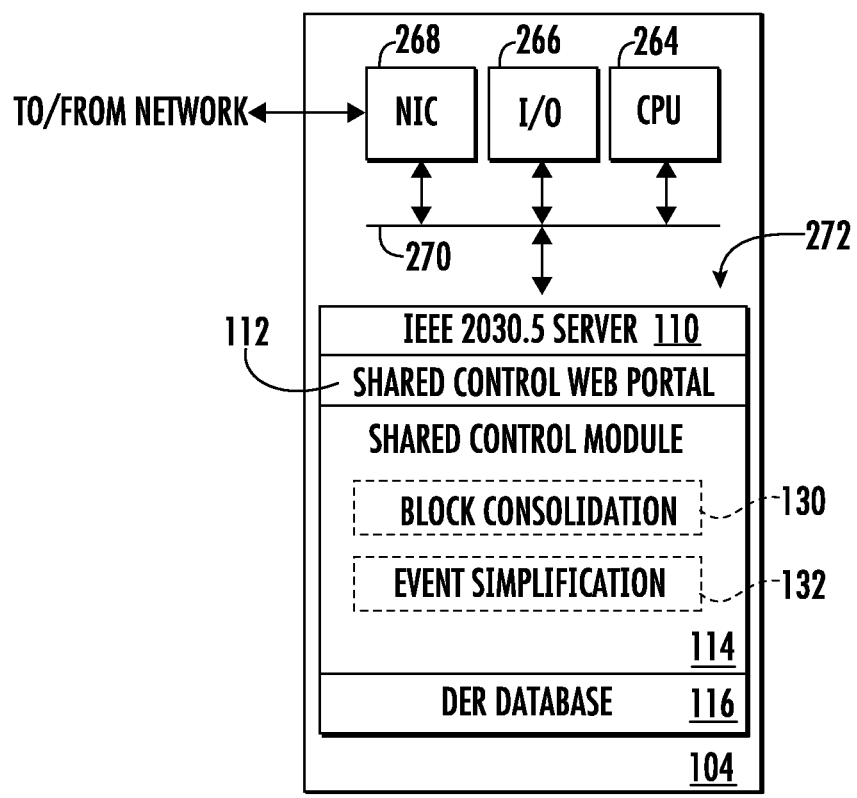
FIG. 2 is a block diagram providing additional detail of an exemplary server-based implementation of the DER service platform shown in FIG. 1.

FIG. 2 is a block diagram providing additional detail of an exemplary server-based implementation of the DER service platform 104. As shown, the DER service platform 104 includes components such as a central processing unit 264, input/output devices 266 and one or more network interface circuits 268 in communication over a bus 270. A memory 272 is also connected to the bus 270. The memory 272 stores executable instructions to implement the IEEE 2030.5 server 110, the shared control Web portal 112, the shared control module 114, and the DER database 116. As is discussed below, the shared control module 114 includes a block consolidation module 130 operative to consolidate block-based control and access information from multiple client entities (e.g., utility and service provider clients) by making block-level changes to the priorities of the events and controls comprising the blocks. As is also discussed herein, the shared control module 114 further includes an event simplification module 132 configured to simply the often complex events resulting from the block consolidation process into repackaged streams of simplified events for transmission to the DER devices 102. In other embodiments the DER service platform 104 may be implemented as cloud-based service.

Figure 3:
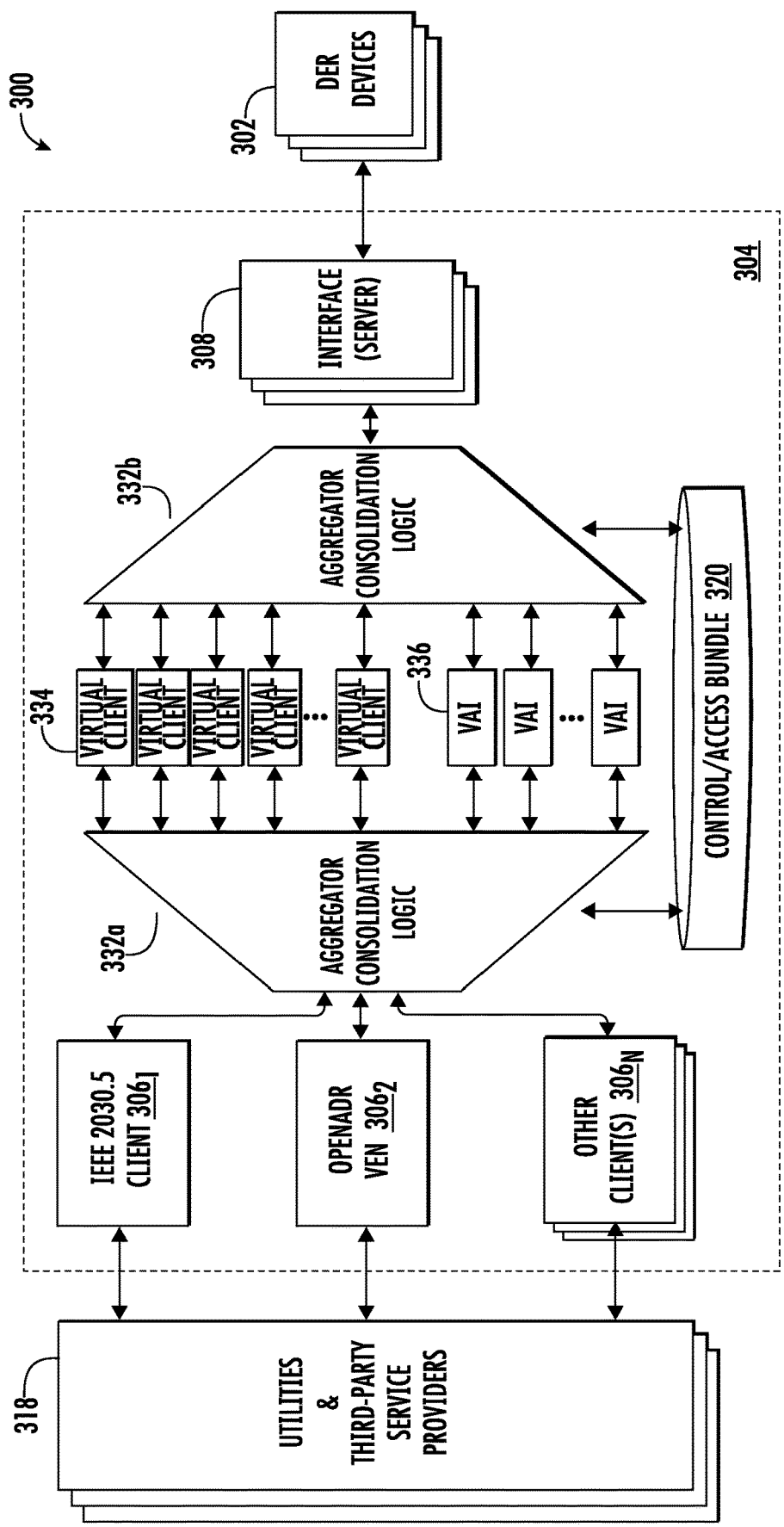
FIG. 3 provides a block diagrammatic view of a system including a DER service platform configured to facilitate shared control of DER devices in accordance with an embodiment.

Turning now to FIG. 3, a block diagrammatic view is provided of a system 300 including a DER service platform 304 configured to facilitate shared control of DER devices 302 in accordance with an embodiment. As shown, service providers including utilities and third-party service providers 318 must have a contractual or other interest in controlling the DER devices 302 that are connected over a network to the DER service platform 304. The service providers 318 may include, for example, operators of the DER devices 302, owners of the DER devices 302, and utilities or third-party energy service providers. One or more interface servers 308 are provided for enabling network communication between the DER service platform 304 and the DER devices 302.

The IEEE 2030.5 clients 306$_1$, OpenADR clients 3062 and other clients 306$_N$ (including clients supporting proprietary protocols and platform APIs) provide a connection between service providers 318 and the platform 304. Service providers 318 via the corresponding client 306 may each desire to control, monitor and/or communicate with one or more of the DER devices 302 in accordance with DER control, metrology and control/access bundle information associated with the service providers 318. The information necessary for service providers 318 to control and monitor DER device 302 is stored within the platform 304 in control/access bundles maintained within a control/access bundle database 320.

The control/access bundles stored by database 320 comprise a database of information needed to equitably and deterministically share control of DER devices 302 and determine access rights to control/data. As is discussed below, the aggregator consolidation logic 332 using the control/access bundle data stored by the control/access bundle database 320 may include programs or otherwise be configured to mediate control of the DER devices 302 by the third party service providers 318 based upon the third party contractual, regulatory and other access rights information. The aggregator consolidation logic 332 may mediate this control by appropriately generating consolidated streams of events to the virtual clients 334. The virtual clients 334 may, to varying degrees, simplify these event streams on behalf of the DER devices 302. These simplified streams of events may, for example, be compliant with a standard (e.g., the IEEE 2030.5 standard) to which one or more of the DER devices 302 conform or may be placed in a format proprietary to certain other DER devices 302.

In one embodiment a DER control is based on an IEEE 2030.5 event. In general, each IEEE 2030.5 event is defined with respect to a specific start time and is of a finite duration. Examples of DER controls which may be applied to DER devices include setting a fixed output power, setting a fixed power factor, setting a Volt-VAr curve, and setting a Volt-Watt curve. A given IEEE 2030.5 event may be applied by the DER service platform 304 to one or more topology nodes and to one or more independent nodes defined by one of the control/access bundles stored in the control/access bundle database 320. The one or more topology nodes defined by each control/access bundle collectively form a hierarchical system topology model of a grid network. The one or more independent nodes defined by each control/access bundle are independent of each other and of the topology model. A given DER device 302 can be a member of, or be otherwise associated with, multiple different independent nodes and topology nodes of the hierarchical system topology model associated with a given control/access bundle. Applying events to the independent node or topology node of a control/access bundle allows these events to control a single or multitude of DER devices 302 affiliated with the independent node or topology node.

The DER service platform 304 may include aggregator-consolidation logic 332 and a plurality of virtual clients 334 respectively corresponding to the DER devices 302. In one embodiment the aggregator-consolidation logic 332 operates to multiplex/demultiplex information sent from, and received by, the platform 304 by service providers 318 via their corresponding clients 306 and DER devices 302. The logic 332 may also be adapted to handle multiple protocols, priorities, access control rights, stacking of controls, and the like.

Each virtual client 334 models the behavior and function of one of the physical DER devices 302. During operation of the platform 304 each virtual client 334 processes the control information corresponding to one or more service providers 318 to generate events for transmission to corresponding DER devices 302. As is discussed below, this processing may include combining and prioritizing potentially conflicting controls within the above referenced control information in such a way as to produce a serial stream of events easily handled by the associated physical DER device 302. Stated differently, using a complex event stream created by the aggregator consolidation logic 332 on behalf of one or more services providers 318, each virtual client 334 may implement logic configured to simplify and/or partially simplify this event stream on behalf of a physical DER device 302. This obviates the need to verify that each DER device 302 is capable of "unraveling" or otherwise parsing potentially conflicting control information or is otherwise able to process complex events. As a result, the DER devices 302 may be implemented with potentially less robust capabilities and thus more economically. Additionally, event simplification performed by the virtual clients 334 provides a trusted platform that can act as an agent to multiple third-party service providers 318.

In addition to performing event simplification, each virtual client 334 may provide responses back to a utility or other service provider in those cases in which the information necessary for such responses is lost through the event simplification process (in which case the applicable DER device 302 would be incapable of providing the necessary response). In many instances each virtual client 334 functions to simply pass through various types of information. For example, if an alarm is generated by the DER device 302 with which the virtual client 334 is associated, the virtual client 334 would pass the alarm to the correct service provider(s) 318 via the aggregator consolidation logic 332 and the corresponding clients 306. The virtual client 334 would typically pass through telemetry generated by its associated DER device 302 in a similar manner.

The DER service platform 304 may further include a plurality of virtual aggregated devices 336. Each virtual aggregated device 336 (hereinafter a "virtual aggregated inverter" or "VAI") represents all of the DERs associated with a given topology node stored in the control/access bundle database 320. Each VAI may be configured to represent or otherwise provide an indication of, for example, telemetry (e.g., metrology, responses, alarms, etc.) associated with the DERs which it represents. As an example, in the case in which a VAI was associated with a node in the topology (e.g., at a substation), the VAI would appear as a single client representative of the potentially thousands of clients that are descendants of the substation. In order to affect this the VAI 336 would be configured to combine telemetry as necessary. This combining could involve summing power, averaging voltage or other statistics of voltage (peak high, peak low, etc.), providing statistics on alarms, responses, and the like. The VAIs 336 may provide, for example, a vehicle through which a service provider or utility 318 via its associated IEEE 2030.5 client $306_1$ could receive aggregated telemetry through an "in band channel" conforming to IEEE 2030.5. Service providers 318 can optionally identify the topology nodes of interest for a VAI 336 by associating a control program for these nodes. In other embodiments aggregated information could be provided by the platform 304 outside of the IEEE 2030.5 standard using alternate techniques.

It may be appreciated that different third-party service providers 318 may have different objectives with respect to operation of the DER devices 302. As a consequence, the DER controls for each service provider 318 stored as part of the control/access bundles maintained in database 320 may have different characteristics. Assume for exemplary purposes that one of the DER devices 302 is an inverter for a solar energy installation configured to monitor voltage in the electrical grid to which it is connected. On a sunny day (e.g., in the spring) the voltage on the grid may rise because of the increased level of electricity produced by grid-connected solar energy installations during periods in which demand does not commensurately increase. If the voltage goes up by too much on a certain segment of the grid, then the grid will typically shut off that portion in order to protect itself, thus creating a blackout and grid instability. So a service provider 318 that is a utility may have an interest in grid stability and thus would be incented to have the exemplary inverter (i.e., DER device 302) operate consistent with a DER control curve requiring that if the monitored grid voltage exceeds a certain threshold, the solar energy installation associated with the inverter will be adjusted to produce less output power. Moreover, since the utility will typically be in the business of selling electricity produced by other sources, it may have a further incentive to curtail the output power of DER devices 302 connected to the electrical grid since this would increase demand for the electricity which it produces.

On the other hand, an owner of the solar installation will typically be incented to maximize the monetary value of their system. This would normally manifest as producing the maximum amount of power annually plus optionally participating in a grid services program offered by a third-party service provider. As a consequence, the DER control curve preferred by the owner of the solar installation associated with the exemplary inverter will generally have characteristics very different from those of the DER control curve associated with the utility. As is described herein, the DER service platform 304 and, more particularly, the aggregator consolidation logic 332 and the virtual clients 334, advantageously enable control of a DER device 302 such as a solar inverter to be shared among service providers 318 having competing and potentially conflicting control preferences and objectives.

Figure 4:
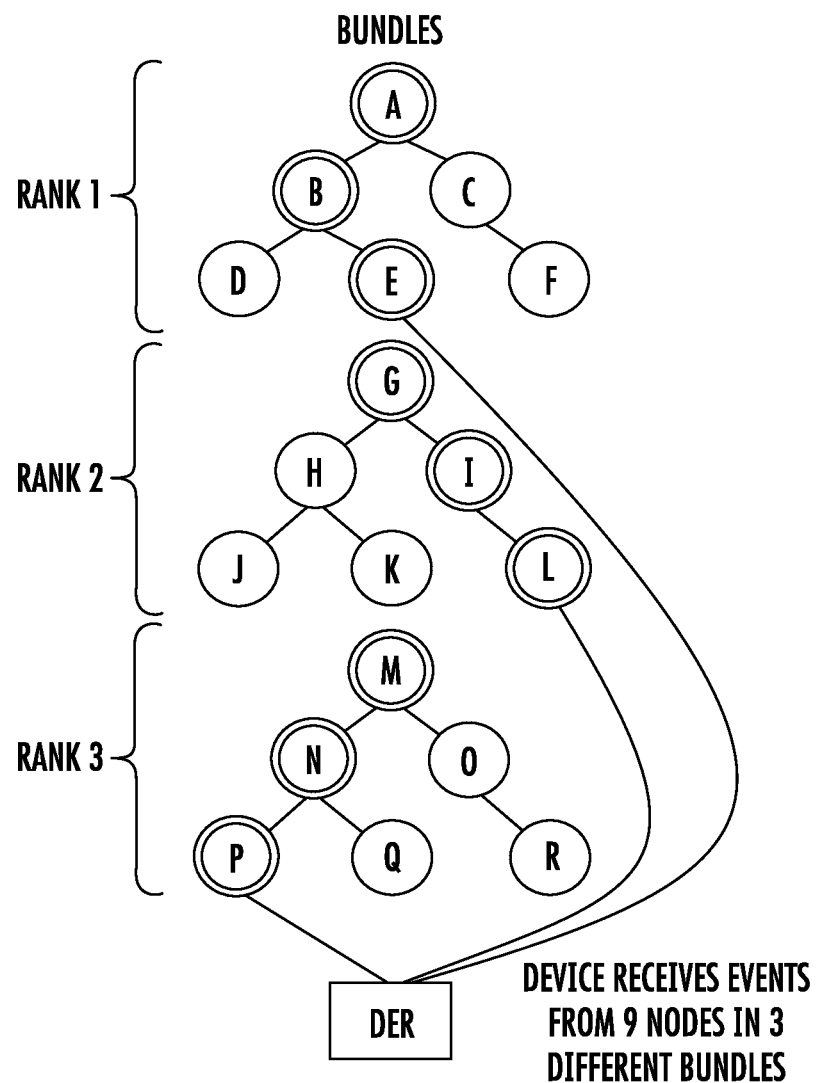
FIG. 4 illustrates an exemplary set of control/access bundles of differing rank stored by a control/access bundle database and maintained by aggregator consolidation logic in managing a given DER device.

Turning now to FIG. 4, an illustration is provided of an exemplary set of control/access bundles ("CABs" or "Bundles") of differing rank stored by the control/access bundle database 320 and maintained by the aggregator consolidation logic 332 in managing a given DER device 302. In general a CAB or Bundle comprises a set of information used to control DER devices 302 and determine access rights to control information and data. In the illustration of FIG. 4, the aggregator consolidation logic 332 manages the DER device 302 by providing (via interface server 308) events from different nodes in three different Bundles. Specifically, the DER device 302 receives events from the control/access bundle database 320 based upon a first Bundle (i.e., nodes A-F) of Rank 1, a second Bundle (i.e., nodes G-L) of Rank 2 and third Bundle (i.e., nodes M-R) of Rank 3.

In one embodiment each Bundle includes control events, access rights and information relating to bounds, capacity and topology. Events from within each Bundle, and events from the Bundles of different rank may conflict if the events overlap in time and are non-orthogonal events. IEEE 2030.5, IEEE 1547 and potentially other standards determine which event types are orthogonal (meaning they do not conflict if time overlapped) and those that are non-orthogonal (meaning they do conflict if time overlapped). As an example, events of the same type are typically non-orthogonal. With respect to non-orthogonal events, at any point in time, the DER device 302 is managed by a single control event from a single Bundle. If at a given time there are no active events derived from any Bundle managing the DER device 302, the DER device 302 may operate under a default control. In one embodiment bounds are used to separate the control rights of each Bundle. The bounds of a Bundle may define allowed control types, time of use, the rank or priority of the Bundle relative to other Bundles. In one embodiment Bundles of the same rank must be separated by allowed control types or time of use. The capacity of a Bundle sets limits on the Bundle with respect to the number of nodes, devices, controls and topology levels associated with the Bundle. The topology of a Bundle is independent of other Bundles and can have a large number of levels to the extent event simplification (discussed below) is used. In one embodiment each Bundle defines which DER device(s) may be accessed by the service provider 318 associated with the Bundle as well as the controls within the Bundle which the service provider 318 is authorized to use.

Figure 5:
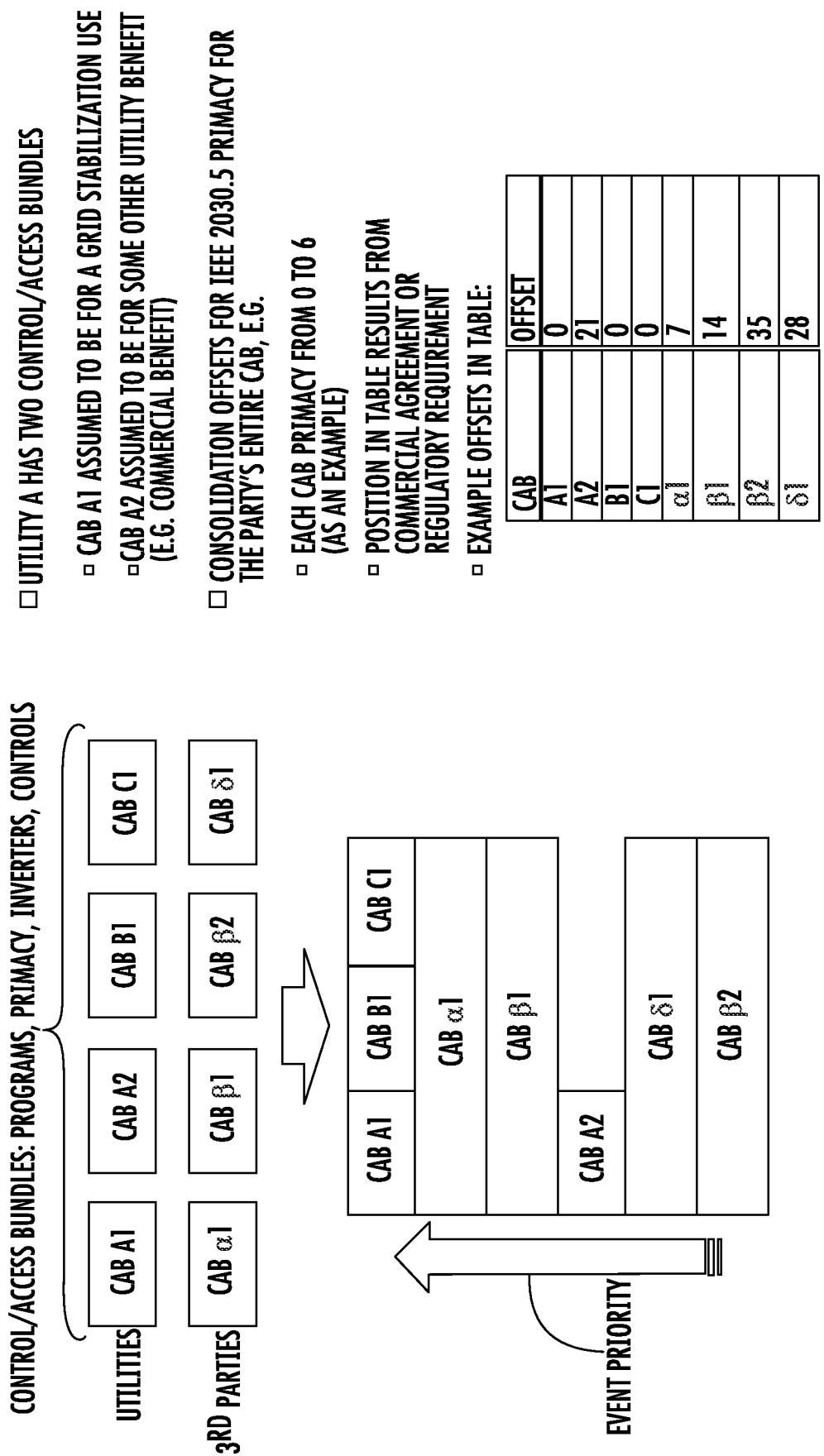
FIG. 5A illustrates one manner in which the aggregator consolidation logic together with the control/access bundle database effects block-based consolidation of the desired controls service providers target to DER devices.
FIG. 5B is a table illustrating the results of an exemplary block consolidation of CABs A1, A2, B1, C1, α2, β1, β2, and δ1.

Attention is now directed to FIG. 5A, which illustrates one manner in which the aggregator consolidation logic 332 together with the control/access bundle database 320 effects block-based consolidation ("block consolidation") of the desired controls service providers 318 target to DER devices 302. In the example of FIG. 5A, one or more non-orthogonal events are shown for each utility and third-party service provider 318. It is assumed that Bundles (CABs) associated with service providers 318 comprised of three utilities and three third-parties are to be consolidated by the aggregator consolidation logic 332 so as to enable a non-conflicting stream of events to be provided to the DER device 302 based upon these six different CABs. That is, although each of the three utilities and three third-parties may provide CABs to aggregator consolidation logic 332 for use in controlling the DER device 302, the aggregator consolidation logic 332 is configured to consolidate these CABs in the manner described hereinafter so that only a single non-orthogonal event from a single CAB is used to control the DER device 302 at any given point in time.

As shown in FIG. 5A, the CAB for each utility is identified by a Roman character (i.e., CAB A, CAB B and CAB C) and the CAB for each third-party is identified by a Greek character (i.e., CAB α, CAB β and CAB δ). Service providers 318 may have one or more CABs, each identified by a numeral. As shown, utility A has two CABs (i.e., CAB A1 and CAB A2), and utilities B and C each have one CAB (i.e., CAB B1 and CAB C1). Similarly, third-party service provider α and δ each have one CAB (i.e., CAB α1 and CAB δ1), while third-party service provider β has two CABs (i.e., CAB β1 and CAB β2). In the example of FIG. 5A, CAB A1, CAB B1 and CAB C1 are all assumed to include controls and events designed by their respective utilities to achieve grid stabilization. CAB A2 is assumed to be a package of controls and events which when applied to the DER device 302 are designed to achieve some other benefit (e.g. a commercial benefit); therefore, CAB A2 is a lower priority than CAB A1 and thus has a higher primacy. (note that in IEEE 2030.5 lower primacy indicates a higher priority).

In accordance with an embodiment, the aggregator consolidation logic 332 effects block consolidation by modifying the priorities of entire CABs based on contractual or other agreements between the various service providers 318 (e.g., utilities and service providers). In FIG. 5A it is assumed that utilities A, B and C have the highest priority for controls necessary for grid reliability, shown as CAB A1, CAB B1 and CAB C1. This isn't necessarily required, but it is anticipated that in most practical applications applicable regulations will mandate that utilities have a superior right to control DER infrastructure to maintain grid reliability. Since in general a DER device will only be in the geographic service area of a single utility, a conflict is not presented by assigning equal primacy to the highest-priority CABs of the utilities A, B and C (i.e., CAB A1, CAB B1 and CAB C1) even for non-orthogonal control events. Stated differently, utilities do not share DER devices such as inverters and thus the CABs of different utilities 318 will not be in conflict with respect to a given DER device. In contrast, third-party service providers 318 may share control of DER devices with other third-party service providers 318 and with utilities 318.

Turning now to FIG. 5B, a table is provided illustrating the results of an exemplary block consolidation of the CABs A1, A2, B1, C1, α2, β1, β2, and δ1. This block consolidation process effectively prioritizes the CABs of the service providers and utilities 318. In the embodiment of FIG. 5B there are a finite number (i.e., 0-6) of primacy levels within a CAB, although in other embodiments a different number of primacy levels may be available within a CAB (e.g., 0 to 15). Since in the example of FIG. 5B each CAB includes 7 primacy levels, CABs of adjacent rank are offset by 7 primacy levels (e.g., CABs for utilities A1, B1 and C1, being the highest priority, have primacy offsets of zero, while the CAB of next highest priority, i.e., CAB a1, has a primacy offset of 7). Stated differently, CAB α1 has a primacy offset (i.e., 7) which is greater than the maximum primacy (i.e., 6) within a CAB of the highest priority.

The position of each CAB within the table of FIG. 5B may be determined by, for example, commercial agreements between and among the utilities and service providers 318. As a result of the block consolidation process represented by the table of FIG. 5B, the primacies of the events within each CAB in the table are modified to have offsets corresponding to the relative position of their respective CAB within the table (except for the events in the highest priority CABs A1, B1, C1, which have a primacy offset of zero). In a practical application this could be the result of, for example, a contractual relationship between the owner of the DER device 302 and the service provider 318 identified by α1. Similarly, CAB β1 has an offset of 14, potentially as a result of a commercial program being run by service provider β1. CAB A2 receives an offset of 21, and so on.

In exemplary embodiments each CAB may include a multitude of events and controls, e.g. 20, 30 or more. It may be appreciated that the block consolidation process may complicate the resultant event processing. Accordingly, in one embodiment the event simplification process described below is applied to the output of the block consolidation process (e.g., to the consolidated blocks having the primacy offsets illustrated by FIG. 5B).

Attention is now directed to FIGS. 6-9, which illustratively represent event simplification and partial event simplification processes in accordance with an embodiment. For the purposes of FIGS. 6-9, non-orthogonal events are shown. In an exemplary implementation the event simplification (i.e., deconstruction and repackaging of complex events into relatively simpler events) effected by the platform 304 on behalf of a given DER device 302 is performed by the virtual client 334 associated with such DER device 302. Since the virtual clients 334 are configured to render simplified and repackaged events compliant with the applicable standard, each DER device 302 (whether or not certified and/or or standard-compliant), will see the simplified events as correct events conforming to the applicable standard and use them as appropriate.

One motivation for configuring the virtual clients 334 to conduct event simplification is that various standards, such as IEEE 2030.5, require compliant DER devices to be able to correctly perform certain event processing and simplification tasks. These requirements place large burdens on developers of DER devices. Moreover, once DER devices are actually deployed, there is no simple way of determining to what extent such fielded DER devices have correctly performed such event processing and simplification, even to the extent such fielded DER devices behave differently than expected. Moreover, proprietary DER devices (i.e., DER devices not purporting to comply with IEEE 2030.5 or another standard) are typically incapable of performing complex event processing in a manner compliant with the applicable standards. Again, even if such proprietary DER devices were to attempt to perform complex, standardized event processing or simplification, there exists no straightforward way of certifying such devices are 100% compliant with the applicable standard. As a consequence, ensuring that each virtual client 334 is able to perform event processing and repackaging of complex events into simple events obviates the need for fielded DER devices to be compliant with the complexities of applicable standards, thereby removing a substantial burden on those deploying such devices.

It may be appreciated that IEEE 2030.5 defines event processing rules (simplification) for events within a "function set" and within a control type. A function set is a collection of similar functions that target a use-case in IEEE 2030.5. For example, the DER function set is used for behind-the-meter generation facilities. IEEE 1547 defines additional rules for event processing within the DER function set but between control types (so a compliant DER device has to comply with both IEEE 2030.5 and IEEE 1547). It is anticipated that there will likely be requirements for event processing between function sets as well, for example, the DRLC (Demand Response/Load Control) function set. As previously described, the current and future event processing rules define which controls and events are considered to be orthogonal and non-orthogonal. Whether the rules used for event processing (simplification) are part of IEEE 2030.5, IEEE 1547, some other standard, or an agreement made with utility and/or third-party service providers 318, implementing the event processing and repackaging it as IEEE 2030.5 compliant simple events is expected to be useful to both utilities and service providers 318. Accordingly, in exemplary embodiments each virtual client 334 is configured to ensure compliance with all standards applicable to the associated DER device 302.

Figure 6:
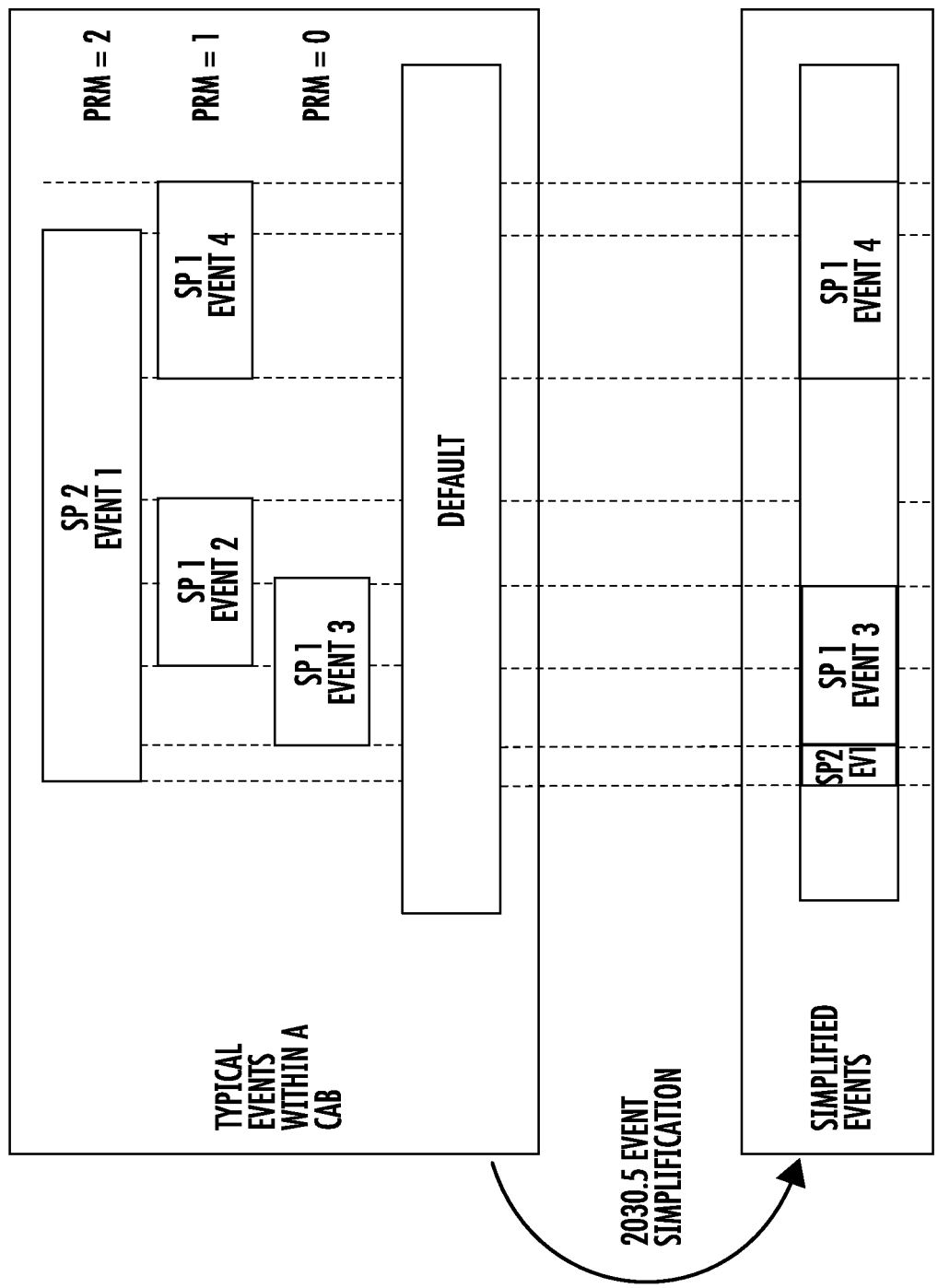
FIG. 6 illustrates an exemplary event simplification process that is compliant with the IEEE 2030.5 specification.

Turning now to FIG. 6, an illustration is provided of an exemplary event simplification process that is compliant with the IEEE 2030.5 specification. Unlike the block consolidation process discussed above, during event simplification the priorities (i.e., primacies), event processing rules and other aspects of the events being simplified are not changed. Rather, complex events are simplified into simpler events by a virtual client 334 and repackaged for transmission to a DER device 302. One objective of the event simplification process is to make it easier for a DER device 302 to correctly follow and execute events that may be issued by the utility and potentially numerous service provider clients sharing control of the DER device 302. For example, in cases in which a DER device 302 was potentially subject to control by a hundred or so events, the DER device 302 would be required to be configured with substantial processing resources in order to be able to simplify and act on such a large number of events.

In the example of FIG. 6, a plurality of events included within a first CAB from a first service provider 318 ("SP1") and within a second CAB from a second service provider 318 ("SP2") are simplified into a set of simplified events in the manner illustrated. In the exemplary case of FIG. 6 only three primacy levels are utilized, i.e., primacies 0, 1 and 2, in conjunction with a default level. As shown, the exemplary CAB for SP1 includes Event 3 of primacy 0 (the highest available priority) and two events of primacy 1 (i.e., Event 2 and Event 4). The CAB for SP2 includes Event 1 of primacy 2. As shown, the event simplification process results in the default event being provided to the DER device 302 (an Inverter in the example of FIG. 6) before the start of Event 1. Although Event 1 is a low priority event (relatively high primacy), it is permitted to start at its appointed time since no other Events of higher priority initially supersede it. Event 3 is of higher priority than Event 1 and so supersedes Event 1 at its scheduled start time. Since Event 2 has a higher primacy number than Event 3, it is superseded by Event 3 and (per the IEEE 2030.5 standard) does not become effective even after Event 3 ends. Accordingly, once Event 3 ends the default event again comes into force (i.e., Event 1 does not resume, and Event 2 does not become active). Although FIG. 6 presents a somewhat elementary example of event simplification compliant with the IEEE 2030.5 specification, the same principles apply to more complex examples.

Figure 7:
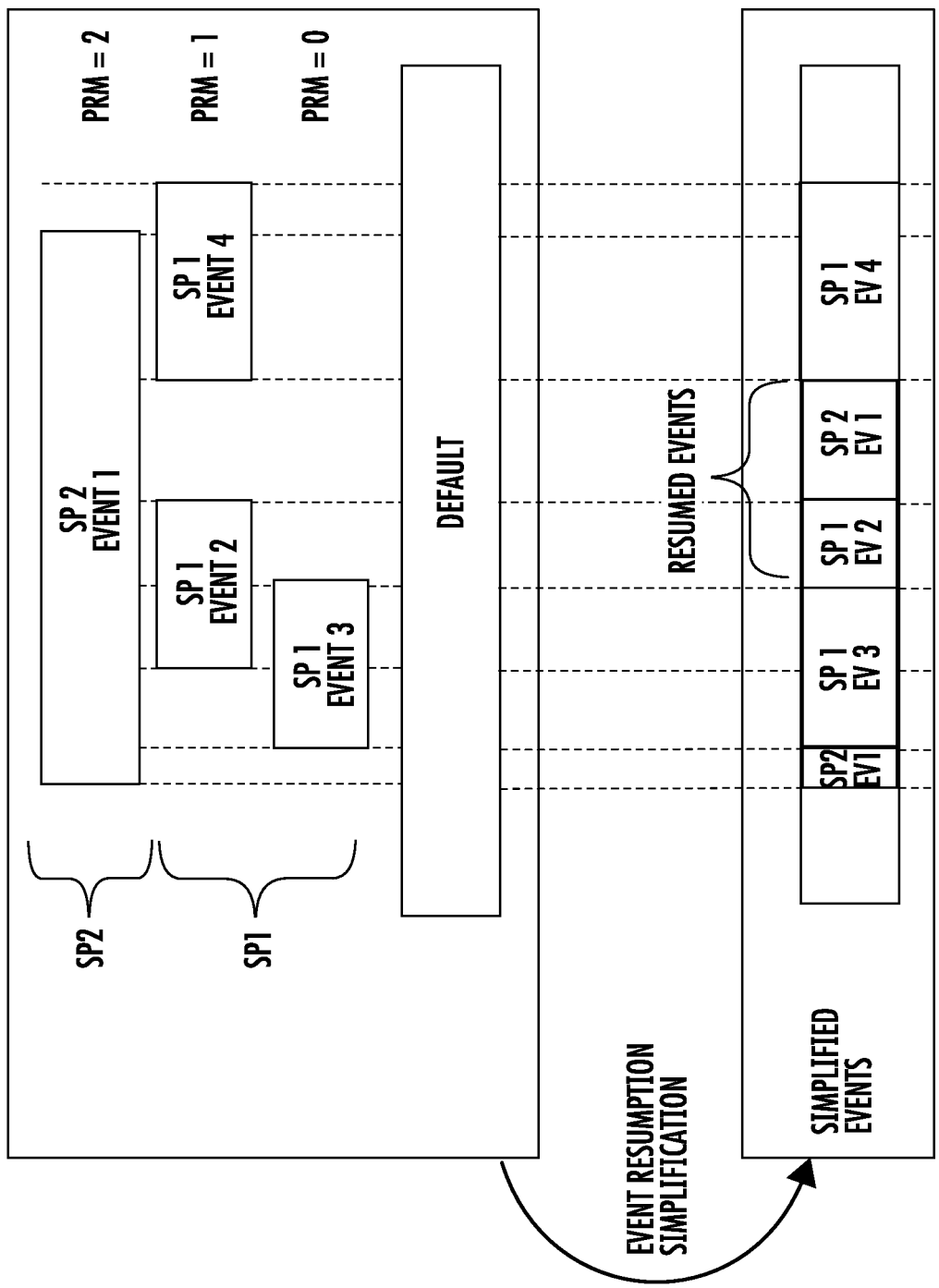
FIG. 7 illustrates an exemplary event simplification process in which an event may be resumed event after it is superseded.

FIG. 7 illustrates an exemplary event simplification process in which, in contrast to the example of FIG. 6, an event may be resumed event after it is superseded. It should be noted that the simplification process illustrated in FIG. 7 is not compliant with the IEEE 2030.5 standard, which was primarily designed to specify event processing rules for a single service provider, i.e., a single utility. Nonetheless, in some use cases the process of FIG. 7 could be considered more "natural" behavior. For example, when a control to set the charge level of an EVSE is superseded by a utility control to limit charging.

Figure 8A:
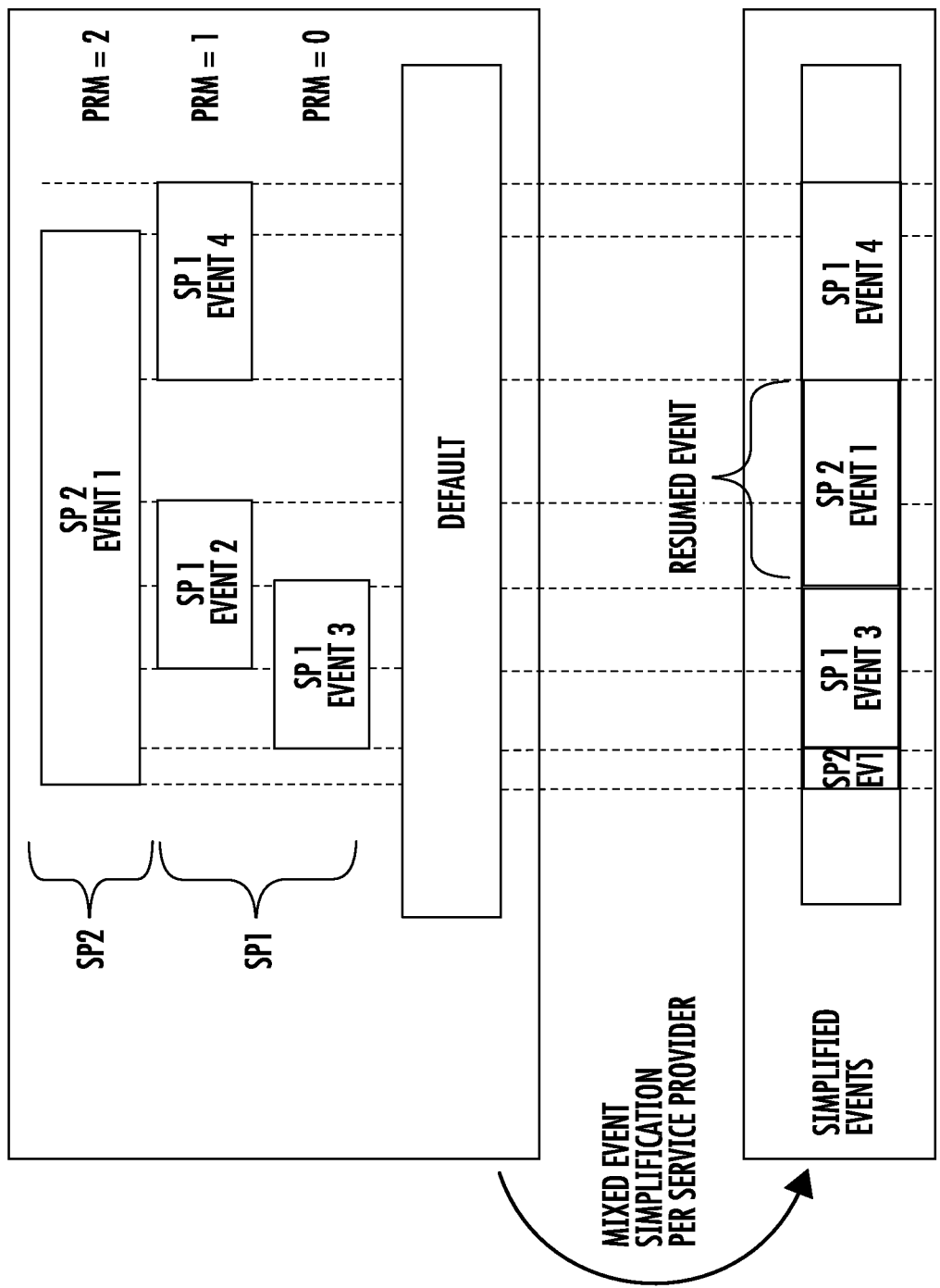
FIG. 8A illustrates a possible event simplification process that targets numerous service providers, i.e. utilities and numerous third-party service providers.

FIG. 8A illustrates a possible event simplification process that targets numerous service providers, i.e. utilities and numerous third-party service providers. FIG. 8A illustrates the same example as FIG. 6, but includes both 2030.5 and non-2030.5 compliant resumption event processing per service provider. In addition, FIG. 8A assumes an out of band mechanism to determine which controls have event resumption and which do not.

As shown in FIG. 8A, the same Events 1, 2, 3 and 4 from CABs associated with service providers SP1 and SP2 are simplified into a stream of simplified events. As shown in FIG. 7, Event 1 is resumed after Event 3 has completed even though Event 3 had superseded and temporarily interrupted Event 1. In other embodiments alternative methods can be used for event resumption that are hybrids of such event processing rules.

Figure 8B:
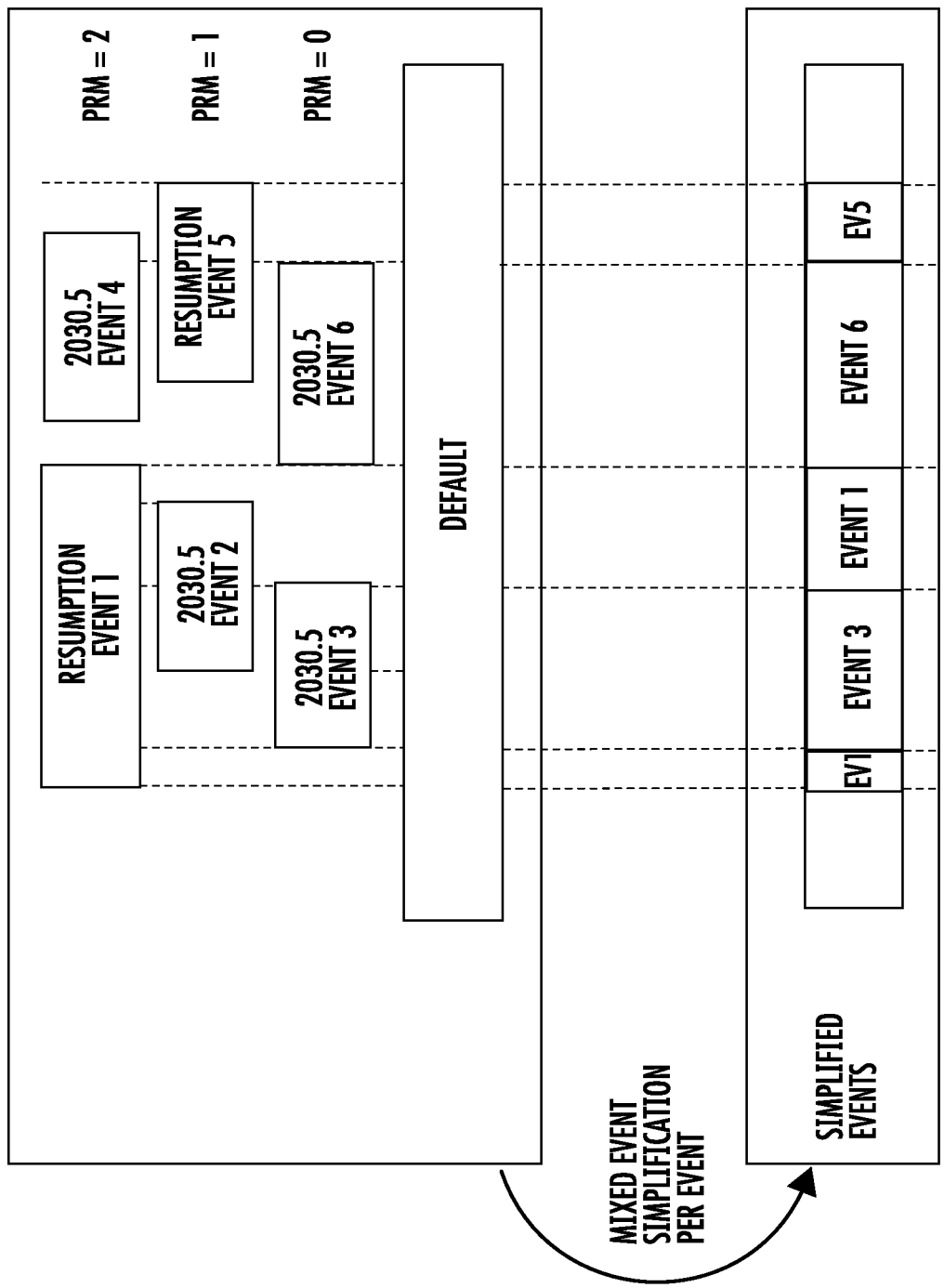
FIG. 8B illustrates a case in which event simplification is performed using a combination of schemes, one or more of which are compliant with IEEE 2030.5 and others of which utilize event resumption after superseding approaches.

FIG. 8B illustrates a case in which event simplification is performed using a combination of schemes, one or more of which are compliant with IEEE 2030.5 and others of which are non-compliant and utilize event resumption after superseding approaches. It may be appreciated that a service provider can use mix of superseding schemes.

Figure 9:
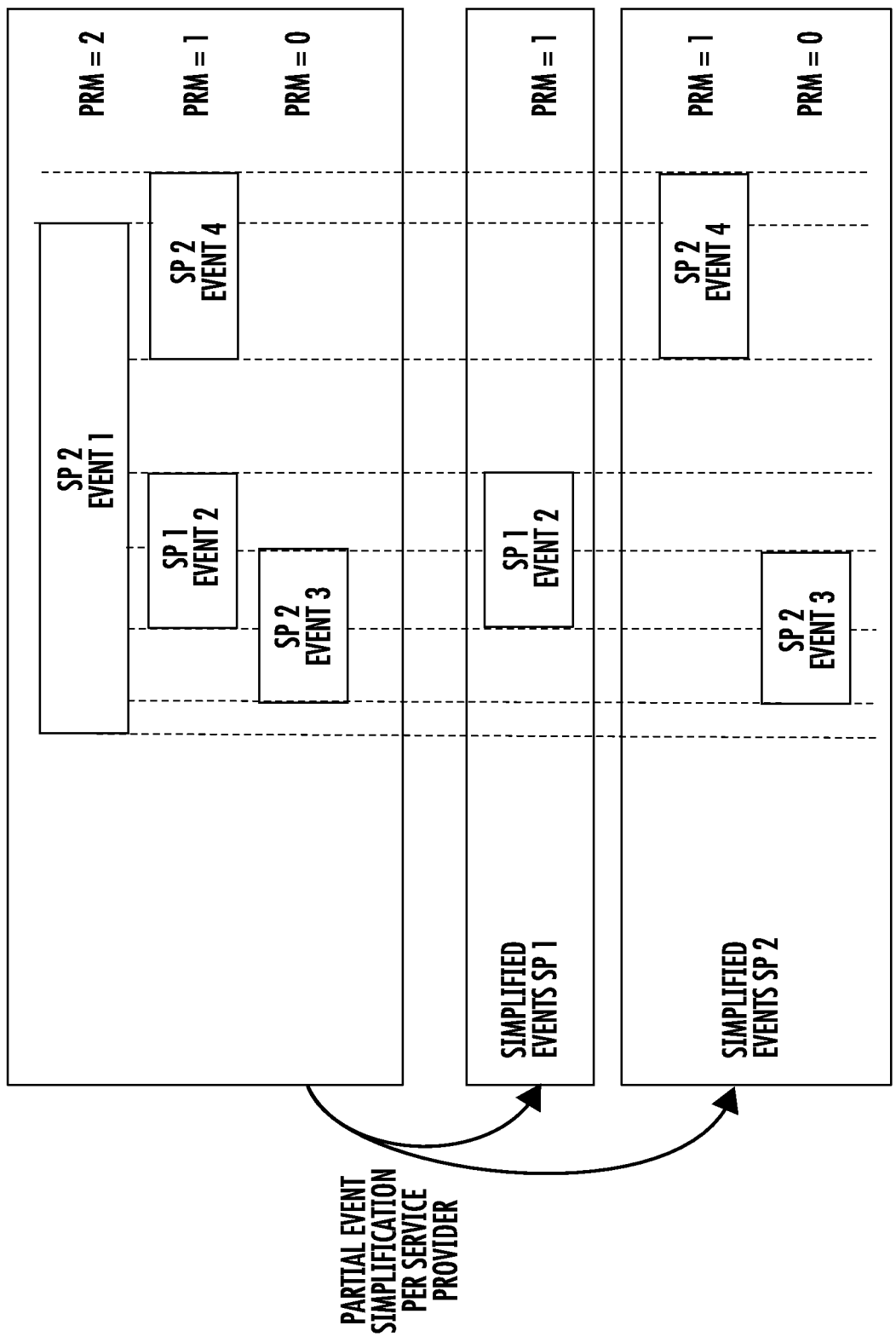
FIG. 9 illustrates an exemplary process for partial event simplification in accordance with the disclosure.

FIG. 9 illustrates an exemplary process for partial event simplification in accordance with the disclosure. In one approach events can be simplified by control type, which permits a DER device 302 or other client to implement multiple event simultaneously to the extent possible. Events can also be simplified per service provider. This permits a client to decide which controls to implement based on other incentives specified by the service provider. In this case the client must be able to distinguish the service provider via description, mRID, etc.

In one embodiment the process for partial event simplification illustrated by FIG. 9 may be utilized in cases in which a DER device 302 (or a local energy management or other system controlling the DER device 302) may have access to more relevant information concerning local conditions or performance of the DER device 302 than does the service platform 304. Rather than effecting complete event simplification in the service platform 304, in the embodiment of FIG. 9 sets of events are allowed to pass down to the DER device 302 for decision. This enables client third party services and devices to participate in control decisions.

For example, when the DER device 302 is an inverter for a solar system this relevant local information may indicate how bright the sun is shining at a particular instant. Rather than performing all event simplification in the service platform 304, events from two different CABs may be simultaneously or nearly simultaneously sent to the DER device 302. Depending upon the local conditions the DER device 302 then decides to execute one or both of the events even in cases where these events are nonorthogonal. For example, the DER device 302 may be producing sufficient power to be able to execute both events rather than simply the event having the highest priority at a given time.

Attention is now directed to FIGS. 10-14, which depict exemplary approaches to creating and updating control/access bundles and facilitating the processing of events in accordance with the disclosure.

Figure 10:
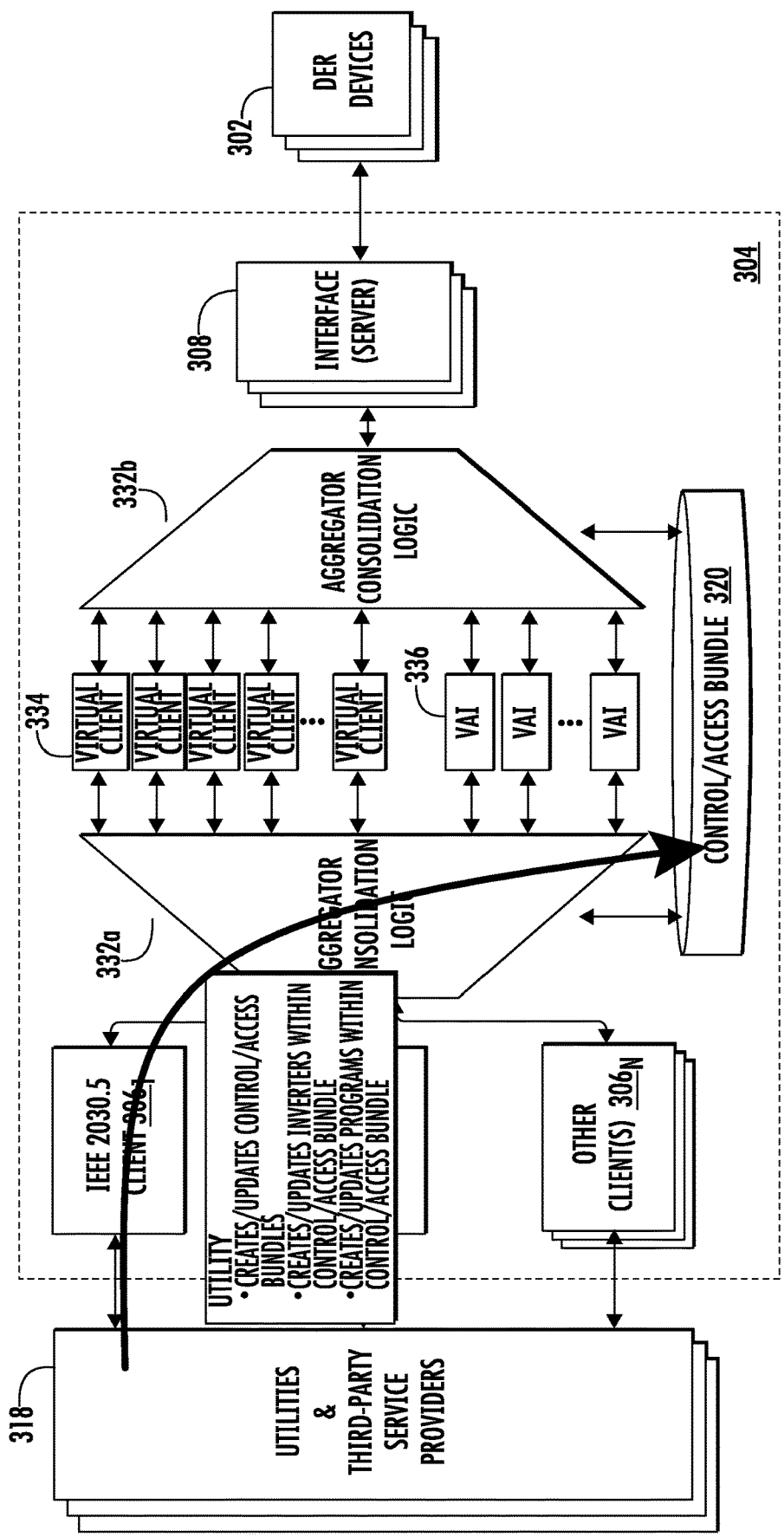
FIGS. 10-14 depict exemplary approaches to creating and updating control/access bundles and facilitating the processing of events in accordance with the disclosure.

Turning to FIG. 10, a utility entity client may create and update, via a 2030.5 client $306_1$, various information maintained by the control/access bundle database 320 of the service platform 304. For example, the Utility 318 may create, and update control/access bundles, inverters and programs stored within the database 320.

Figure 11:
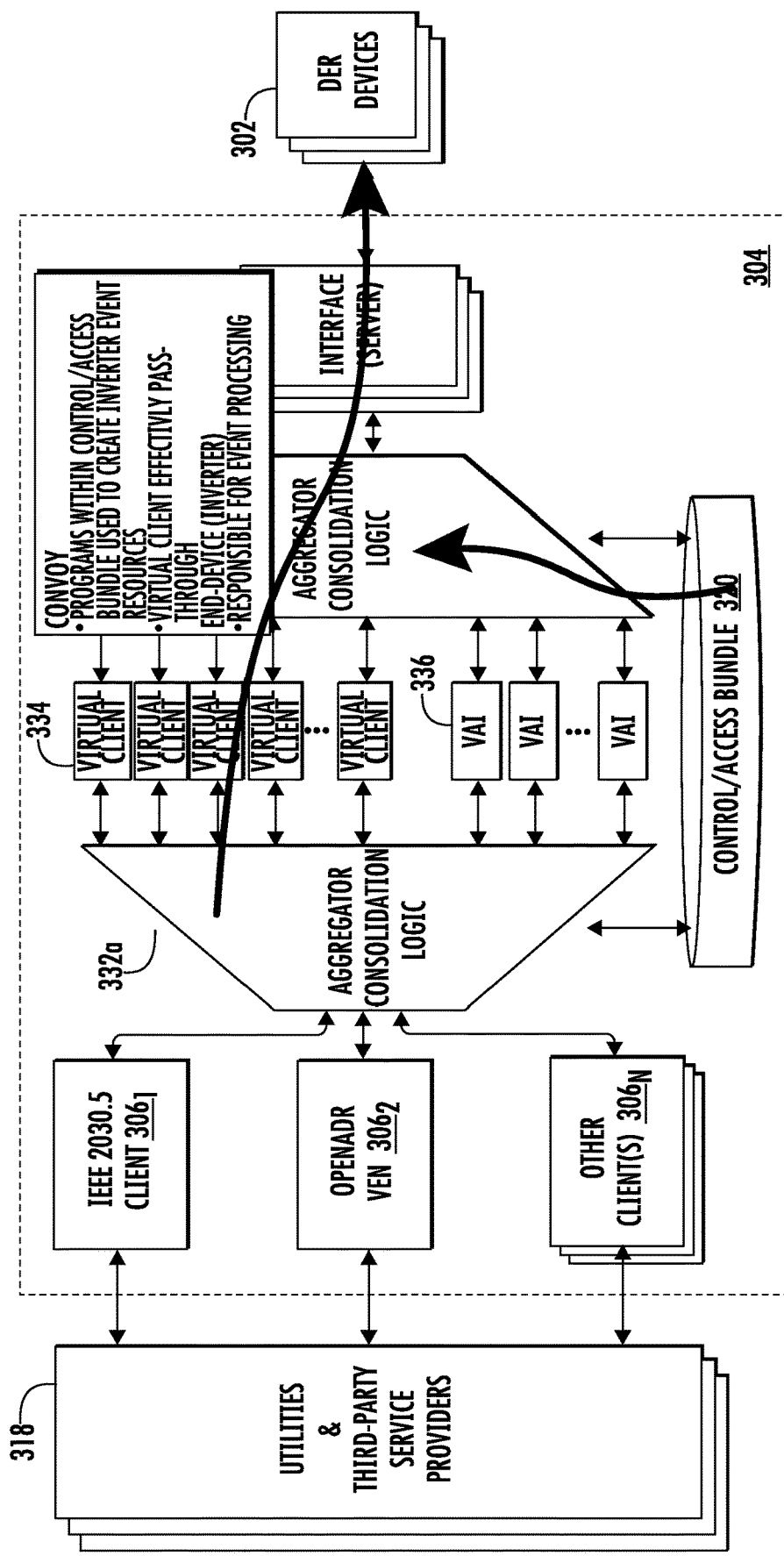

FIG. 11 illustrates a process in which control/access bundle and/or other information previously provided to the control/access bundle database 320 by the utility 318 via the 2030.5 client $306_1$ is communicated by the platform 304 to a DER device 302 for processing. That is, rather than utilizing a virtual client 334 associated with the DER device 302 for event simplification or processing, the virtual client 334 effectively acts as a passthrough and the DER device 302 performs event processing. The control/access bundle information, or event resources derived from such information, may be provided by the service platform 304 to the DER device 302 either in accordance with the IEEE 2030.5 standard, another internationally recognized standard, or a proprietary API.

Figure 12:
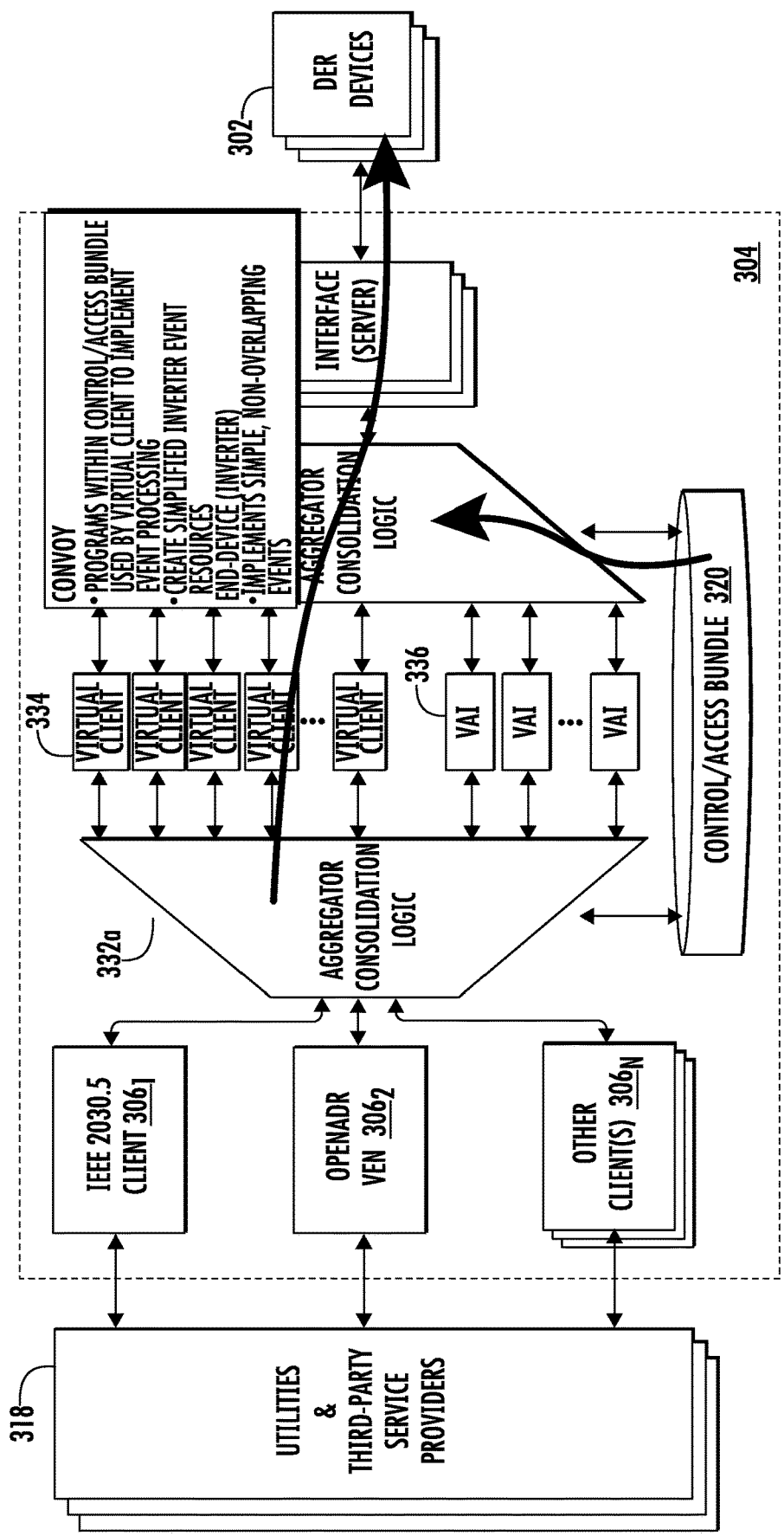

FIG. 12 illustrates a process in which programs within control/access bundle information previously provided to the control/access bundle database 320 by the utility 318 via the 2030.5 client $306_1$ are utilized by a virtual client 334 to implement event processing on behalf of an associated DER device 302. In the implementation of FIG. 12 the simplified, non-overlapping events created by the virtual client 334 from the control/access bundle information may be provided to the DER device 302 either in accordance with the IEEE 2030.5 standard, another internationally recognized standard, or a proprietary API.

Figure 13:
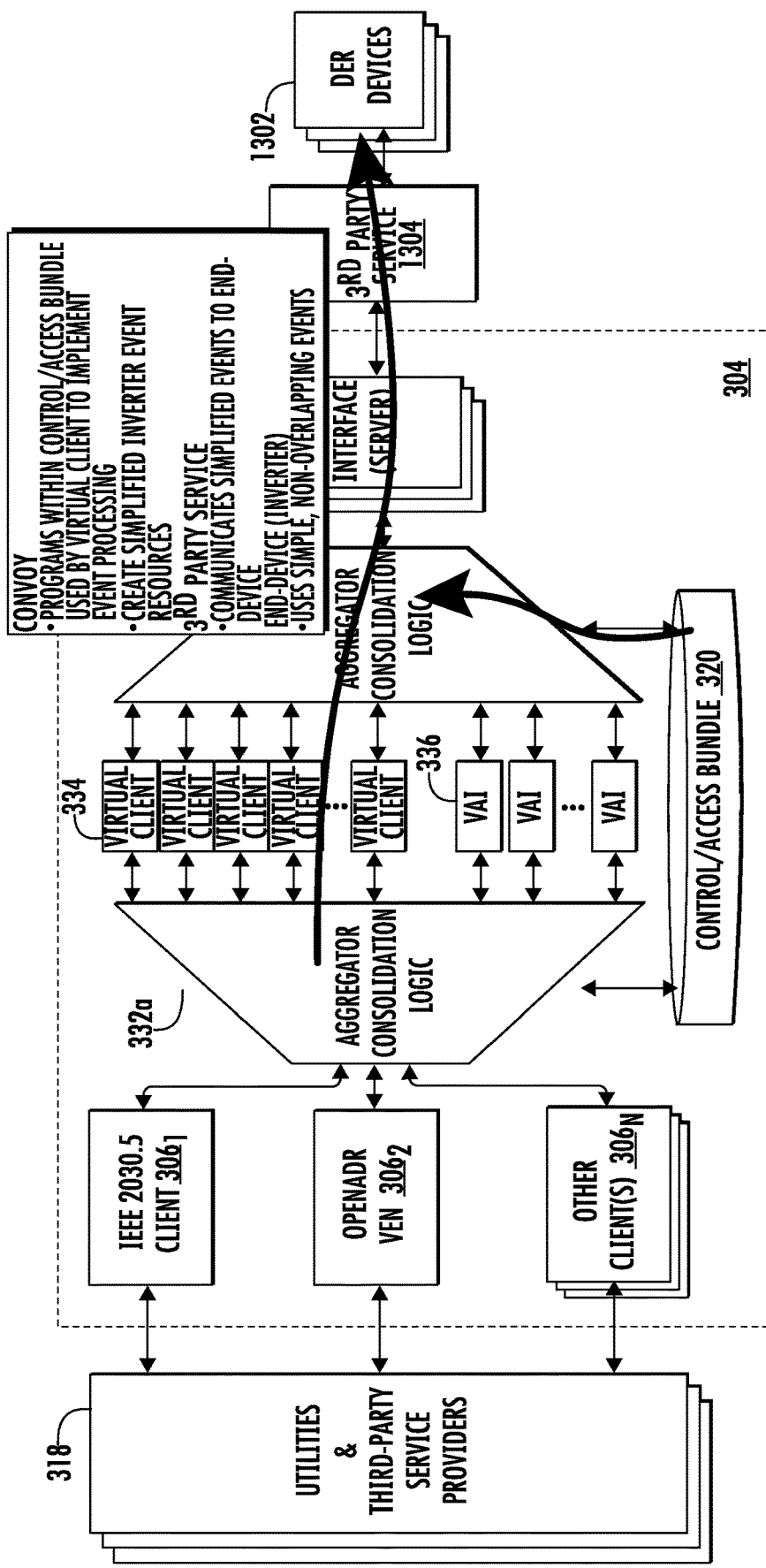

Turning now to FIG. 13, an illustration is provided of a system in which the service platform 304 performs event processing and communicates the results to a $3^{rd}$ party service 1304 in control of one or more DER devices 1 utilizing a proprietary API of the service 1304. In one embodiment the $3^{rd}$ party service provider 1304 is implemented as a cloud-based service provider, but this is not required. As shown, programs within control/access bundle information previously provided to the control/access bundle database 320 by the utility 318 via the IEEE 2030.5 client $306_1$ are utilized by a virtual client 334 to implement event processing. The resulting simplified event resources are then provided by the service platform 304, which in turn communicates simplified, non-overlapping events to the one or more DER devices 1302 for execution.

In one embodiment the $3^{rd}$ party service provider 1304 may own and install the DER devices 1302 (e.g., batteries) at a commercial site. This may enable the commercial site to, for example, reduce the energy-related charges it may otherwise pay to a utility. The owner of the commercial site will typically pay the $3^{rd}$ party service provider 1304 for this service. In this embodiment the service platform 304 enables the $3^{rd}$ party service provider 1304 to connect to a utility entity and to receive, via a IEEE 2030.5 client $306_1$, curves or other control information from the utility for use by the $3^{rd}$ party service provider 1304 in controlling the DER devices 1302. That is, the service platform 304 enables the proprietary DER devices 1302, which are operated by the $3^{rd}$ party service provider 1304, to nonetheless be provided with events or other control information created by a utility 318. Note that in FIG. 13, the $3^{rd}$ party service provider 1304 must be trusted to apply the controls of the utility and possibly one or more other $3^{rd}$ party service providers 318 even when these other controls are in conflict with the controls $3^{rd}$ party service provider 1304 wishes to apply. This demonstrates the need for service platform 304 to act as an agent for all utilities and $3^{rd}$ party service providers 318 as shown in the exemplary embodiment of FIG. 14.

Figure 14:
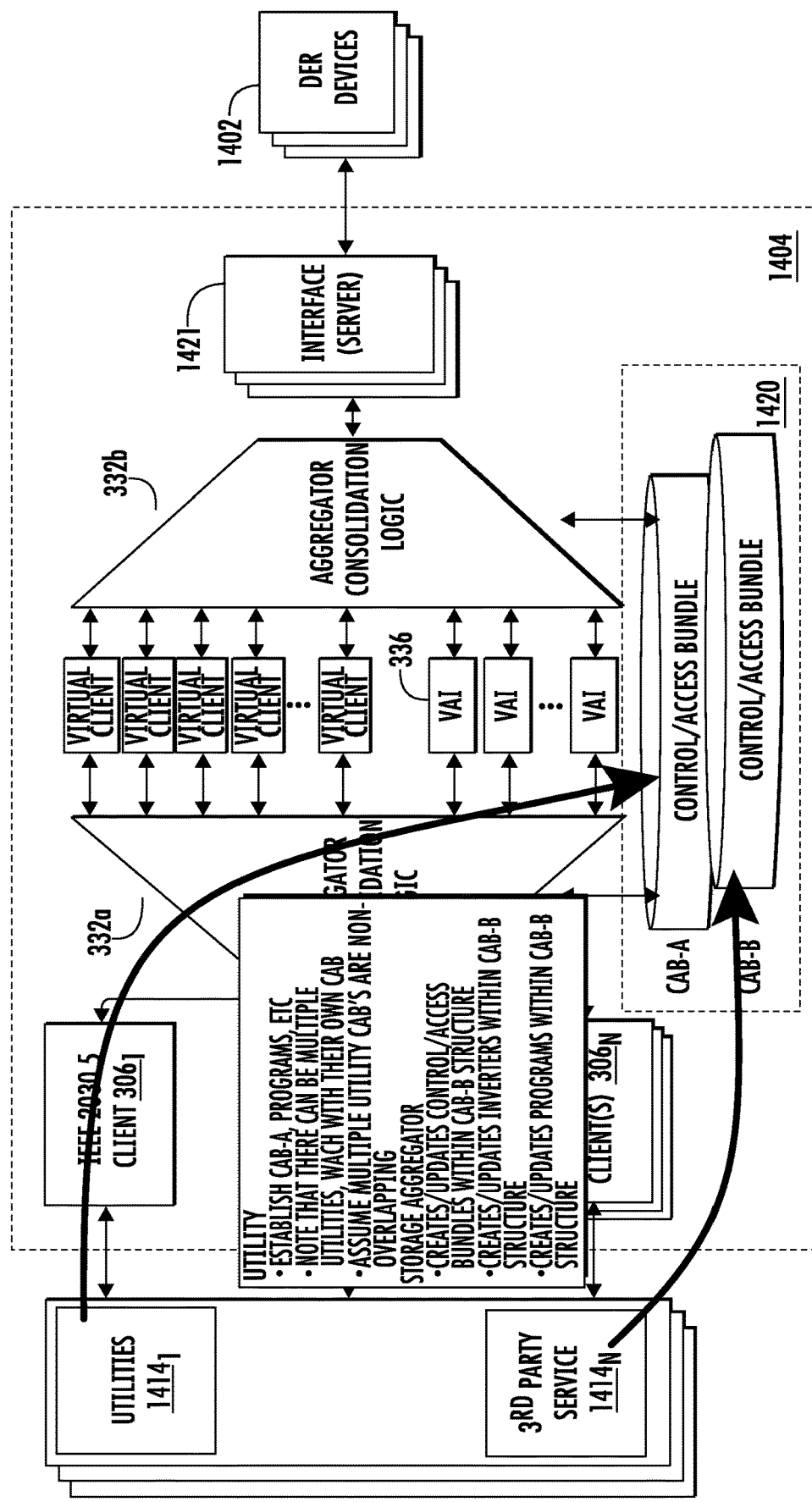

FIG. 14 illustrates an exemplary manner in which the service platform 1404 facilitates control of DER devices 1402 to be shared by a utility 1414$_1$ (via a IEEE 2030.5 client 306$_1$) and one or more $3^{rd}$ party service providers 1414$_N$ via other client(s) 306$_N$. In this case both the utility and one or more $3^{rd}$ party service providers 1414 create control/access bundles stored within the control/access bundle database 1420. Specifically, the utility 1414$_1$ provides control/access bundle information, programs, and the like to the control/access bundle module 1420 in order to establish a first control access bundle ("CAB-A"). In one embodiment more than a single utility entity may contribute a CABs, collectively identified as "CAB-A" when, for example, each utility is associated with a separate and non-overlapping geographic area and/or set of DER devices 1402. Similarly, the one or more $3^{rd}$ party service providers 1414$_N$ may also establish CABs within the control/access bundle module 1420, such CABs being collectively identified as "CAB-B". The CABs within CAB-B may, for example, include control/access information, model inverter information, and programs useful in controlling the DER devices 1402.

The service platform 1404 advantageously enables, for example, contractual agreements and regulatory requirements to be put in place between the utilities 1414$_1$ associated with CAB-A and the $3^{rd}$ party service providers 1414$_N$ associated with CAB-B. In particular, the service platform 1404 enables enforcement of the control and access rights defined by these contractual agreements and/or regulatory requirements that are reflected within the control and access information within CAB-A and CAB-B. This may involve, for example, and in accordance with the teachings described herein, performing block consolidation based upon CAB-A and CAB-B and then creating a simplified, non-overlapping stream of events by performing event simplification with respect to the results of the block consolidation process. This simplified stream of events may then be sent by the platform 1404 via one or more interface servers 1421 to the DER devices 1402.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools and may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The non-transitory computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

In addition, data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish a relationship between information in fields of a data structure, including through the use of pointers, tags or other mechanisms that establish relationship between data elements.

In addition, various inventive concepts may be embodied as one or more methods, of which an example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of facilitating control of a distributed energy resource, the method comprising:

establishing, at a platform in communication over a network with the distributed energy resource, a first control access bundle of a first rank, the first control access bundle defining a first container including a first plurality of control events for controlling the distributed energy resource;

establishing, at the platform, a second control access bundle of a second rank different from the first rank, the second control access bundle defining a second container including a second plurality of control events for controlling the distributed energy resource;

generating consolidated control events from ones of the first plurality of control events and ones of the second plurality of control events wherein ones of the first plurality of control events are accorded a higher priority than ones of the second plurality of control events during the generating of the consolidated control events; and sending events corresponding to the consolidated control events over the network to the distributed energy resource, the events controlling one or more parameters of the distributed energy resource.

2. The method of claim 1 wherein the higher priority results in the distributed energy resource being controlled by a one of the consolidated control events corresponding to a one of the first plurality of control events when the one of the first plurality of control events and a one of the second plurality of control events are simultaneously in an active state.

3. The method of claim 1 wherein the first control access bundle is associated with a first entity and the second control access bundle is associated with a second entity different from the first entity.

4. The method of claim 3 wherein the first control access bundle includes first access information defining access to the distributed energy resource by the first entity and wherein the second control access bundle includes second access information defining access to the distributed energy resource by the second entity.

5. The method of claim 3 further including establishing, at the platform, a third control access bundle of a third rank different from the first rank and the second rank, the third control access bundle being associated with the first entity and defining a third container including a third plurality of control events for controlling the distributed energy resource wherein the generating consolidated control events includes using ones of the third plurality of control events and according higher priorities to the ones of the first plurality of control events and the ones of the second plurality of control events relative to ones of the third plurality of control events.

6. The method of claim 3 further including establishing, at the platform, a third control access bundle of a third rank different from the first rank and the second rank, the third control access bundle being associated with the second entity and defining a third container including a third plurality of control events for controlling the distributed energy resource;

wherein the generating consolidated control events includes using ones of the third plurality of control events, the ones of the first plurality of control events and the ones of the second plurality of control events being accorded higher priorities than the third plurality of control events during the generating of the consolidated control events.

7. The method of claim 1 wherein the generating consolidated control events includes creating a set of simplified events using the first plurality of control events and the second plurality of control events wherein the simplified events are configured to be executed by the distributed energy resource in compliance with a standard, the creating including applying event processing rules to the first plurality of control events and the second plurality of control events.

8. The method of claim 7 wherein the distributed energy resource is an inverter, the creating including establishing a virtual inverter at the platform wherein the virtual inverter is configured to model the inverter.

9. A method of shared control of a distributed energy resource, the method comprising:
receiving a first control access bundle of a first rank, the first control access bundle being associated with a first entity and defining a first container including a first plurality of control events for controlling a distributed energy resource;
receiving a second control access bundle of a second rank different from the first rank, the second control access bundle being associated with a second entity and defining a second container including a second plurality of control events for controlling the distributed energy resource;
storing, at a platform in communication with the distributed energy resource over a network, the first control access bundle and the second control access bundle;
receiving first instructions for controlling the distributed energy resource, the first instructions being associated with the first entity;
receiving second instructions for controlling the distributed energy resource, the second instructions being associated with the second entity;
generating, in response to the first instructions and the second instructions, consolidated control events from ones of the first plurality of control events and ones of the second plurality of control events wherein ones of the first plurality of control events are accorded a higher priority than ones of the second plurality of control events during the generating of the consolidated control events; and
sending events corresponding to the consolidated control events over the network to the distributed energy resource, the events controlling one or more parameters of the distributed energy resource.

10. The method of claim 9 wherein the higher priority results in the distributed energy resource being controlled by a one of the consolidated control events corresponding to a one of the first plurality of control events when the one of the first plurality of control events and a one of the second plurality of control events are simultaneously in an active state.

11. The method of claim 9 wherein the first control access bundle includes first access information defining access to the distributed energy resource by the first entity and wherein the second control access bundle includes second access information defining access to the distributed energy resource by the second entity.

12. The method of claim 9 further including establishing, at the platform, a third control access bundle of a third rank different from the first rank and the second rank, the third control access bundle being associated with the first entity and defining a third container including a third plurality of control events for controlling the distributed energy resource wherein the generating consolidated control events includes using ones of the third plurality of control events and according higher priorities to the ones of the first plurality of control events and the ones of the second plurality of control events relative to ones of the third plurality of control events.

13. The method of claim 9 further including establishing, at the platform, a third control access bundle of a third rank different from the first rank and the second rank, the third control access bundle being associated with the second entity and defining a third container including a third plurality of control events for controlling the distributed energy resource;
wherein the generating consolidated control events includes using ones of the third plurality of control events, the ones of the first plurality of control events and the ones of the second plurality of control events being accorded higher priorities than the third plurality of control events during the generating of the consolidated control events.

14. The method of claim 9 wherein the generating consolidated control events includes creating a set of simplified events using the first plurality of control events and the second plurality of control events wherein the simplified events are configured to be executed by the distributed energy resource in compliance with a standard, the creating including applying event processing rules to the first plurality of control events and the second plurality of control events.

15. The method of claim 14 wherein the distributed energy resource is an inverter, the creating including establishing a virtual inverter at the platform wherein the virtual inverter is configured to model the inverter.

16. The method of claim 9 wherein a plurality of distributed energy resources are connected to the platform and wherein the first control access bundle includes first access information permitting the first entity to direct ones of the first plurality of control events to each of the plurality of distributed energy resources and wherein the second control access bundle includes second access information permitting the second entity to direct ones of the first plurality of control events to only a subset of the plurality of distributed energy resources.

17. The method of claim 1 wherein the events include a stream of simplified, non-overlapping events, the method including simplifying the consolidated control events to create the stream of simplified, non-overlapping events.

18. The method of claim 9 wherein the events include a stream of simplified, non-overlapping events, the method including simplifying the consolidated control events to create the stream of simplified, non-overlapping events.

* * * * *